(12) United States Patent
Fox, Jr.

(10) Patent No.: US 8,313,063 B2
(45) Date of Patent: Nov. 20, 2012

(54) PARACHUTE RELEASE SYSTEM AND METHOD

(76) Inventor: Roy L. Fox, Jr., Belleville, WV (US)

( * ) Notice: Subject to any disclaimer, the term of this patent is extended or adjusted under 35 U.S.C. 154(b) by 0 days.

(21) Appl. No.: 13/216,448

(22) Filed: Aug. 24, 2011

(65) Prior Publication Data
US 2011/0303793 A1 Dec. 15, 2011

Related U.S. Application Data

(63) Continuation of application No. 12/576,604, filed on Oct. 9, 2009, now Pat. No. 8,033,507.

(60) Provisional application No. 61/111,371, filed on Nov. 5, 2008.

(51) Int. Cl.
B64D 17/38 (2006.01)

(52) U.S. Cl. .................................... 244/151 B

(58) Field of Classification Search .............. 24/637, 24/645; 244/151 B, 138 R, 142, 148–150
See application file for complete search history.

(56) References Cited

U.S. PATENT DOCUMENTS

| | | | |
|---|---|---|---|
| 2,483,088 A | 9/1949 | De Haven | |
| 2,502,097 A | 3/1950 | Linder | |
| 2,665,163 A | 1/1954 | Gross | |
| 2,712,913 A | 7/1955 | Stanley | |
| 2,774,560 A | 12/1956 | Johnson | |
| 2,924,408 A | 2/1960 | Yost | |
| 3,110,459 A | 11/1963 | Heinrich | |
| 3,122,392 A | 2/1964 | Benditt et al. | |
| 3,266,757 A | 8/1966 | Guienne | |
| 3,466,081 A | 9/1969 | Femia | |
| 3,692,262 A | 9/1972 | Gaylord | |
| 4,030,689 A | 6/1977 | Rodriguez | |
| 4,050,381 A | 9/1977 | Heinemann | |
| 4,155,286 A | 5/1979 | Mihm | |
| 4,161,301 A | 7/1979 | Beardsley et al. | |
| 4,256,012 A | 3/1981 | Cowart et al. | |
| 4,337,913 A | 7/1982 | Booth | |
| 4,339,098 A | 7/1982 | Tardot et al. | |
| 4,342,437 A | 8/1982 | Farinacci | |
| 4,392,411 A | 7/1983 | Minkler | |
| 4,493,240 A | 1/1985 | Norton | |
| 4,592,524 A | 6/1986 | Nohren et al. | |
| 4,697,765 A | 10/1987 | Wimmer | |
| 4,750,404 A | 6/1988 | Dale | |
| 4,765,571 A | 8/1988 | Barbe | |
| 4,955,564 A | 9/1990 | Reuter | |
| 4,998,480 A | 3/1991 | Denis et al. | |
| 5,003,882 A | 4/1991 | Frehaut et al. | |

(Continued)

OTHER PUBLICATIONS

Restriction Requirement dated Feb. 23, 2010 for U.S. Appl. No. 12/535,099.

(Continued)

*Primary Examiner* — Tien Dinh
(74) *Attorney, Agent, or Firm* — Snell & Wilmer L.L.P.

(57) ABSTRACT

A parachute release system is configured to releasably couple a parachute to a payload. A parachute release mechanism is coupled to a suspension strap routed through a strap sleeve. The parachute release mechanism is configured to provide near-simultaneous separation of the suspension straps from the payload via operation of a rotatable hinge pin. The strap sleeve reduces the possibility of the suspension strap becoming entangled with the payload. With this system and method, larger payloads may be supported and/or the mass of the parachute release system may be reduced.

20 Claims, 11 Drawing Sheets

U.S. PATENT DOCUMENTS

| | | | |
|---|---|---|---|
| 5,205,517 A | 4/1993 | Reuter | |
| 5,361,676 A | 11/1994 | Gibbs | |
| 5,618,011 A | 4/1997 | Sadeck et al. | |
| 5,668,346 A | 9/1997 | Kunz et al. | |
| 5,703,315 A | 12/1997 | Coggan | |
| 2,834,083 A | 5/1998 | Newell et al. | |
| 5,816,535 A | 10/1998 | Underwood | |
| 5,825,667 A * | 10/1998 | Van Den Broek | 702/141 |
| 5,884,867 A | 3/1999 | Gordon et al. | |
| 5,887,825 A | 3/1999 | Noel | |
| 5,890,678 A | 4/1999 | Butler, Jr. | |
| 5,899,415 A | 5/1999 | Conway et al. | |
| 6,070,832 A | 6/2000 | Redd | |
| 6,249,937 B1 | 6/2001 | Grenga | |
| 6,257,524 B1 * | 7/2001 | Fitzgerald et al. | 244/142 |
| 6,260,797 B1 | 7/2001 | Palmer | |
| 6,308,642 B1 | 10/2001 | Branam | |
| 6,339,929 B1 | 1/2002 | Udagawa et al. | |
| 6,644,597 B1 | 11/2003 | Bahniuk | |
| 6,669,146 B2 | 12/2003 | Lee et al. | |
| 6,789,766 B2 | 9/2004 | Horst | |
| 7,252,270 B2 | 8/2007 | Mitzmacher | |
| 7,264,205 B2 | 9/2007 | Fox, Jr. | |
| 7,967,254 B2 | 6/2011 | Fox | |
| 8,033,507 B2 | 10/2011 | Fox | |
| 8,083,184 B2 | 12/2011 | Fox | |
| 2004/0108416 A1 | 6/2004 | Parkinson | |
| 2005/0230555 A1 | 10/2005 | Strong | |
| 2008/0017754 A1 | 1/2008 | Taylor | |
| 2008/0149775 A1 | 6/2008 | Dunker et al. | |
| 2008/0283669 A1 | 11/2008 | Hansson et al. | |

OTHER PUBLICATIONS

Notice of Allowance dated Jan. 19, 2010 for U.S. Appl. No. 11/733,542.
Office Action dated Jul. 22, 2010 for U.S. Appl. No. 12/535,099.
Restriction Requirement dated Feb. 7, 2011 for U.S. Appl. No. 12/750,921.
Restriction Requirement dated Jan. 21, 2011 for U.S. Appl. No. 12/698,289.
Restriction Requirement dated Jan. 21, 2011 for U.S. Appl. No. 12/481,356.
Office Action dated Jan. 10, 2011 for U.S. Appl. No. 12/535,099.
Notice of Allowance dated Jul. 22, 2010 for U.S. Appl. No. 12/535,099.
Restriction Requirement dated Dec. 20, 2010 for U.S. Appl. No. 12/576,604.
Office Action dated Jan. 31, 2011 for U.S. Appl. No. 12/576,604.
Office Action dated Jun. 8, 2011 for U.S. Appl. No. 12/750,921.
Final Office Action dated Oct. 18, 2011 for U.S. Appl. No. 12/750,921.
Notice of Allowance dated Oct. 11, 2011 for U.S. Appl. No. 12/535,099.
Notice of Allowance dated May 12, 2011 for U.S. Appl. No. 12/576,604.
Notice of Allowance dated Sep. 1, 2011 for U.S. Appl. No. 12/481,356.
Notice of Allowance dated Apr. 18, 2011 for U.S. Appl. No. 12/698,289.

* cited by examiner

PARACHUTE RELEASE SYSTEM AND METHOD

CROSS REFERENCE TO RELATED APPLICATIONS

This application is a continuation of U.S. patent application Ser. No. 12/576,604 filed on Oct. 9, 2009, now U.S. Patent Application Publication No. 2010/0108817 entitled "PARACHUTE RELEASE SYSTEM AND METHOD". U.S. patent application Ser. No. 12/576,604 claims priority to and is a non-provisional of U.S. Provisional No. 61/111,371 filed on Nov. 5, 2008 and entitled "PARACHUTE RELEASE SYSTEM." Each of the foregoing applications is hereby incorporated by reference in its entirety.

TECHNICAL FIELD

The present disclosure relates to parachutes, particularly to systems and methods for releasing a deployed parachute from a suspended load in a controlled manner.

BACKGROUND

Aerial delivery is frequently used for transporting cargo quickly to areas of limited or hostile access, for example areas without the availability of nearby airports. At times, people in isolated areas, such as jungles, deserts, mountains, polar regions, combat zones, and the like are in need of essential supplies, including food and medical supplies, but are not within access to an airport at which a supply plane could land. In these instances, aerial delivery of cargo from in-flight aircraft may be the sole option. Aerial delivery systems involve the use of parachute systems to slow the descent and gently land the cargo platforms on the ground.

Similar parachute systems are utilized for recovery of aeronautical and astronautical vehicles, including rocket boosters, experimental aircraft and space capsules, returning back to the earth's surface from flights in the upper atmosphere or outer space.

In these aerial delivery and/or recovery systems, a series of parachute deployments is often used to progressively slow the descent velocity of the payload. Use of a series of parachute deployments is often necessary because the force and impulse on the suspension lines and straps of a main parachute (i.e., a parachute large enough to slow the cargo platform to an acceptable landing velocity) deploying at the terminal, free-fall velocity of the cargo platform or vehicle would be excessive, causing the parachute system to fail. Instead, the payload is typically slowed in a series of stages using subsequently larger parachutes.

A drogue parachute is typically deployed first from the parachute system. The drogue is a small parachute which can be easily deployed from its container by a tether attached to the launching cargo plane, by an easily deployed stored energy means such as a spring launched pilot parachute, and/or the like. As the drogue parachute is deployed and inflated, it moderately decelerates the suspended cargo platform, as well as orienting the cargo platform into a desirable upright attitude, without excessive strain on the slings and parachute canopy from which the cargo platform is suspended. At a desired point, for example after a pre-determined time period, the drogue parachute is released from the suspended cargo platform. The drag provided by the released drogue parachute is then utilized to pull and deploy a next, larger parachute. This next parachute may be the main parachute, or another intermediary parachute prior to another subsequent deployment of the main parachute, depending upon the size of the cargo platform and the design of the parachute system.

To accomplish this release, a drogue parachute and/or intermediary parachute is typically attached to the suspended cargo platform by a release mechanism. The suspended cargo platform is suspended from the release mechanism, typically by a series of suspension slings. The suspension slings help maintain the suspended cargo platform in a stable, level attitude. The number of suspension slings is often four, with one routed to each corner of a square or rectangular cargo platform supporting the suspended cargo. For larger platforms, a greater number of suspension slings may be used. The suspension slings may converge at a point above the suspended load to the release mechanism, located at the apex of a pyramid formed by the suspension slings.

The drogue parachute and/or intermediary parachute is often attached to the release mechanism by a single sling or riser. From the top end of this sling, a number of suspension lines radiate to the perimeter of the drogue parachute and/or intermediary parachute canopy.

A common release mechanism is a pyrotechnic cord cutter powered by an explosive or pyrotechnic charge. This mechanism utilizes the detonation of a small explosive charge to drive a cutting blade through the suspension sling. However, pyrotechnic cord cutters are typically usable only for relatively small-diameter cords. As the weight of a platform and payload increases, the size of the cord or strap between the parachute and payload platform increases. A pyrotechnic cord cutter for payloads above a moderate size becomes too large for practical handling, and incorporates an explosive charge too large and powerful for safe handling by personnel.

SUMMARY

A parachute release system and methods for use of the same are provided. In an exemplary embodiment, a parachute release system comprises a parachute release mechanism configured to couple a parachute to a payload, a suspension strap coupled to the parachute release mechanism and configured to couple to the payload, and a collapsible strap sleeve configured to at least partially enclose the suspension strap.

In another exemplary embodiment, a method for separating a parachute from a payload comprises coupling a parachute release mechanism to a payload via a suspension strap routed through a collapsible strap sleeve, and coupling the parachute release system to a parachute. The parachute is deployed to cause the parachute to at least partially inflate, and the parachute release mechanism is operated to cause the parachute to separate from the payload.

In another exemplary embodiment, a parachute release mechanism comprises an outer main plate, an inner main plate coupled to the outer main plate, a rotatable inner latch plate coupled to the outer main plate and the inner main plate, a rotatable outer latch plate configured to engage the inner latch plate, and a rotatable strap hinge pin configured to releasably couple with the inner latch plate.

In another exemplary embodiment, a tangible computer-readable medium has stored thereon, computer-executable instructions that, if executed by a system, cause the system to perform a method. The method comprises transmitting an activation command to a parachute release mechanism to cause a parachute to separate from a payload. The parachute release mechanism is coupled to the payload via a suspension strap routed through a strap sleeve, and the parachute release mechanism is configured as a single-bolt, single pin system.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical parachute release system.

In a parachute and/or parachute release system, it is often desirable to avoid concentrated masses. Thus, it would typically be desirable to allow a particular parachute release system to support an increased payload size without a corresponding increase in the mass of the parachute release system. Correspondingly, it would be generally desirable to allow a reduction in the mass of a particular parachute release system needed to support a given payload size. In accordance with various aspects of the present invention, a parachute release system may be configured with various components and structures in order to achieve a reduced mass and/or increased supported payload size. Moreover, an exemplary parachute release system may also be configured with various components and structures in order to improve reliability and/or controllability when a parachute is released from a payload.

Figure 1A:
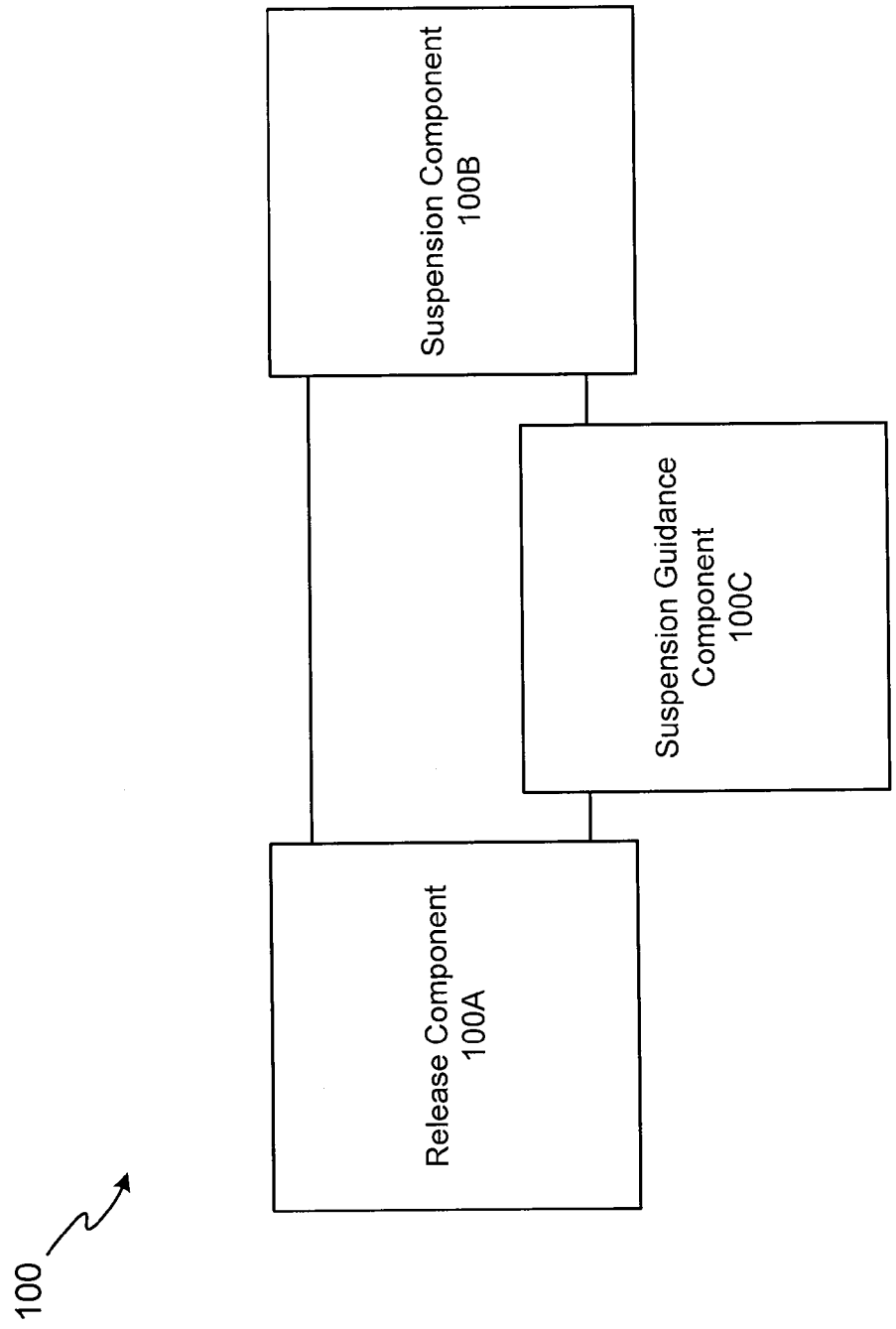
FIG. 1A illustrates a block diagram of a parachute release system in accordance with an exemplary embodiment.

A parachute release system may be any system configured to facilitate controlled separation of a parachute from a payload. In accordance with an exemplary embodiment, and with reference to FIG. 1A, a parachute release system 100 generally comprises a release component 100A, a suspension component 100B, and a suspension guidance component 100C. Release component 100A is configured to releasably couple a parachute to a payload. Suspension component 100B is coupled to release component 100A, and is configured to suspend a payload beneath release component 100A during descent of the payload. Suspension guidance component 100C is coupled to support component 100A and/or suspension component 100B, and may be configured to guide, contain, surround, protect, and/or otherwise facilitate desired operation of suspension component 100B before, during, and/or after a parachute and payload are separated responsive to operation of release component 100A.

Figure 1B:
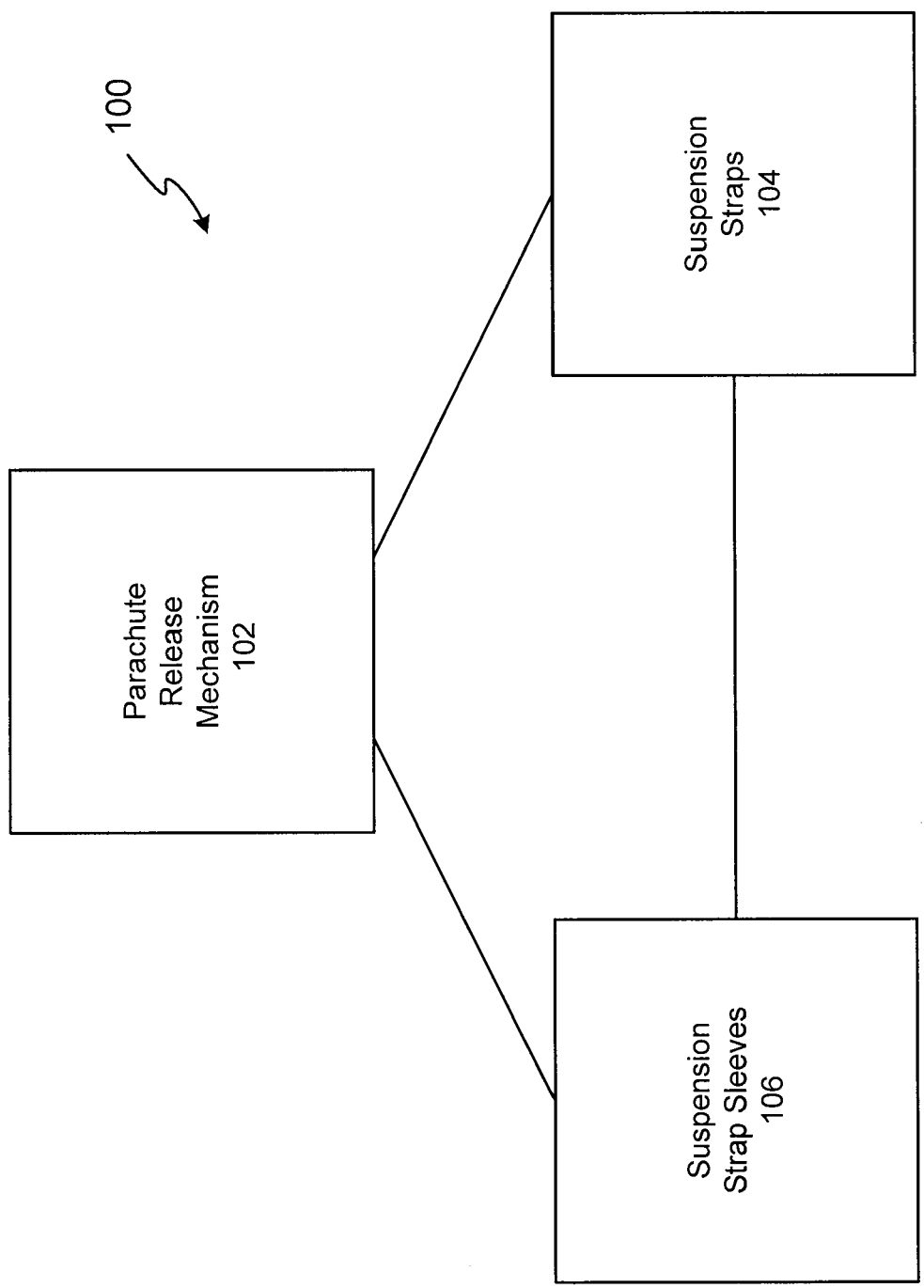
FIG. 1B illustrates a block diagram of a parachute release system in accordance with an exemplary embodiment.
Figure 7:
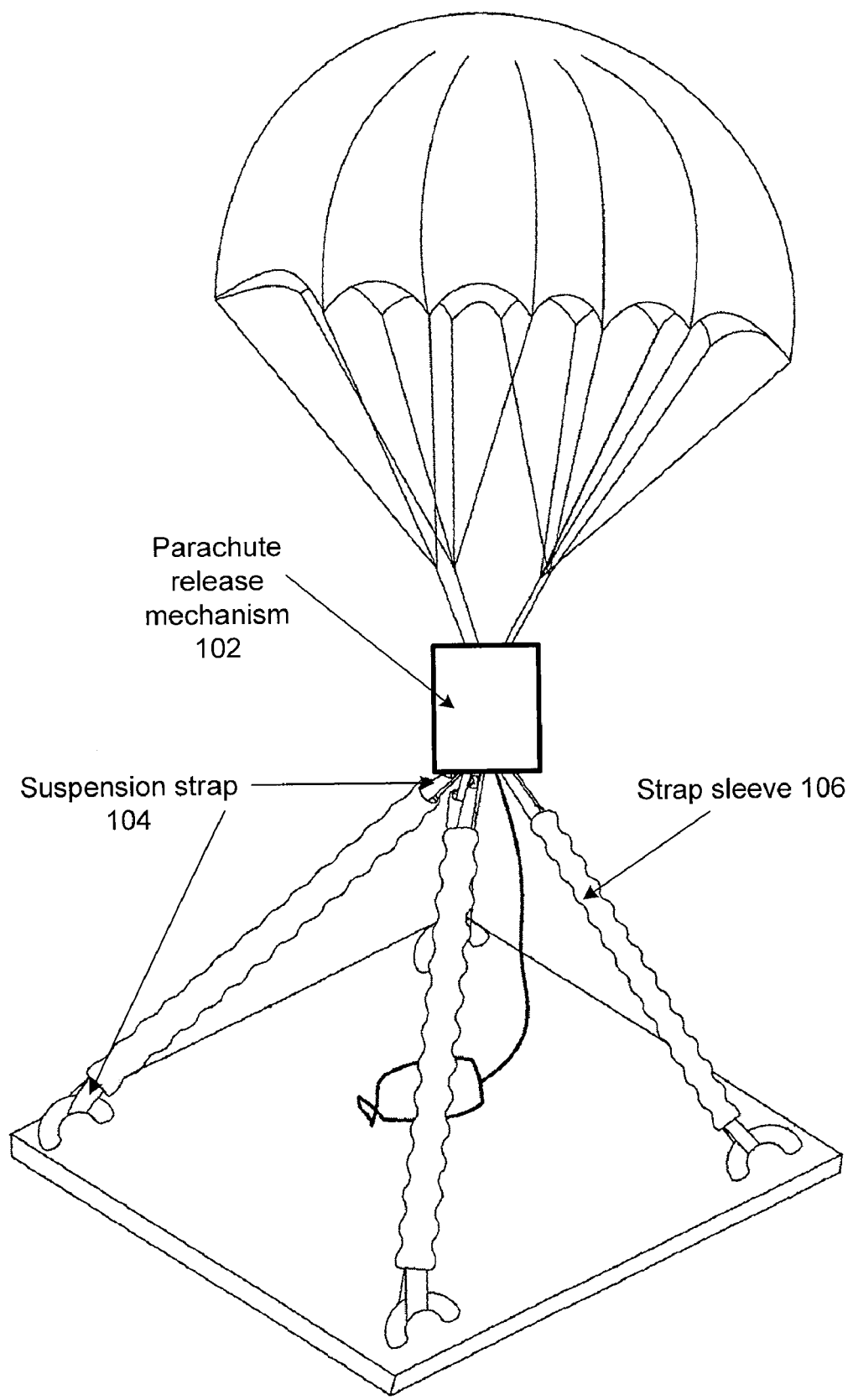
FIG. 7 illustrates a parachute release system coupled to a parachute and a payload in accordance with an exemplary embodiment.

With additional reference now to FIGS. 1B and 7, in an exemplary embodiment a parachute release system 100 comprises components configured to releasably connect a parachute to a payload. Parachute release system 100 comprises release component 100A (e.g., parachute release mechanism 102), one or more suspension components 100B (e.g., suspension straps 104), and one or more suspension guidance components 100C (e.g., suspension strap sleeves 106). Suspension straps 104 may be coupled to a payload. Parachute release mechanism 102 may be coupled to a parachute. Moreover, parachute release system 100 may comprise any suitable components and/or configurations for releasably coupling a parachute to a payload.

Figure 2:
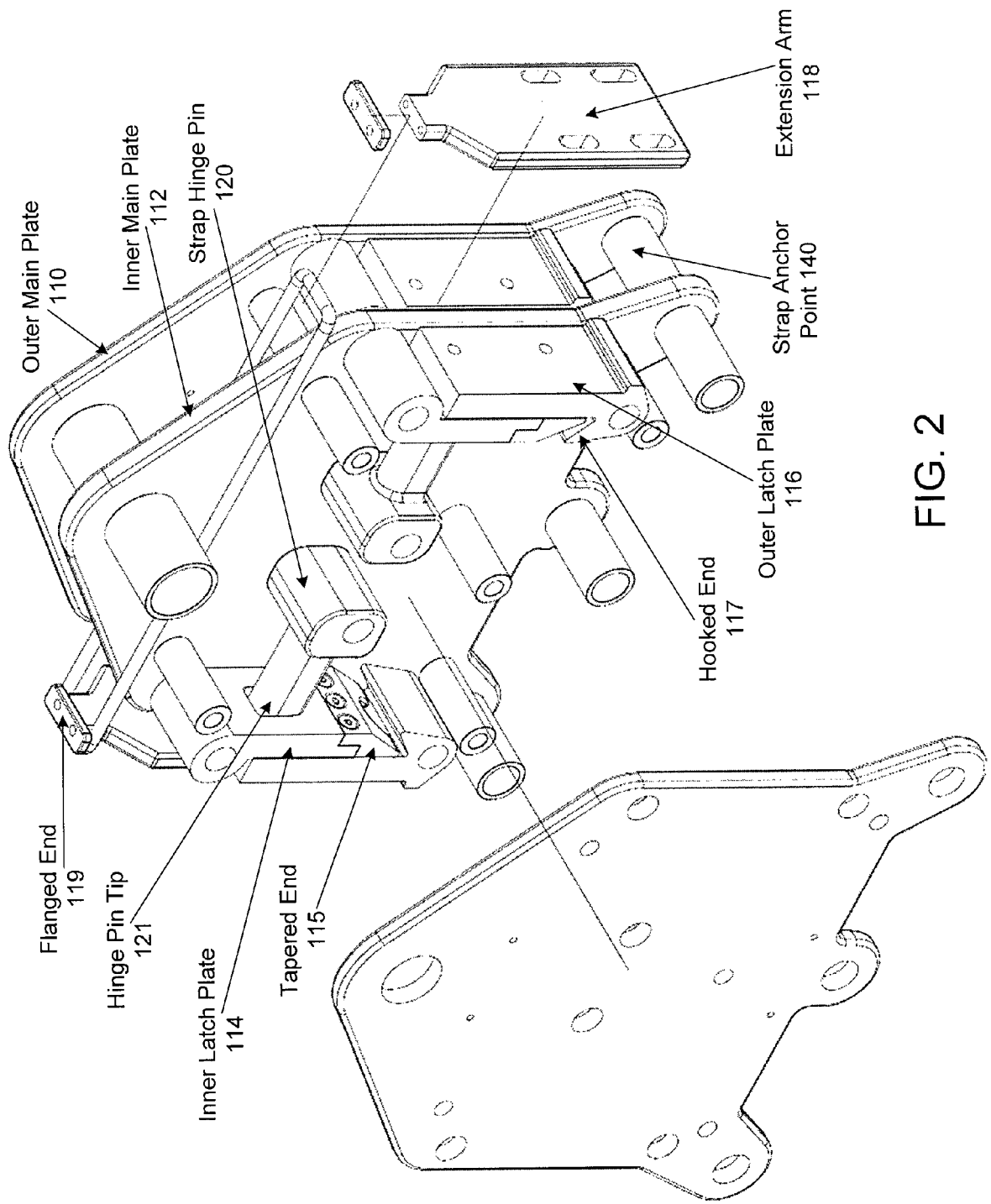
FIG. 2 illustrates an exploded view of a parachute release mechanism in accordance with an exemplary embodiment.

Parachute release mechanism 102 may comprise any suitable components, assemblies, and/or arrangements or configurations configured to releasably connect suspension straps 104 to a payload. With reference now to FIG. 2, in an exemplary embodiment, parachute release mechanism 102 comprises an outer main plate 110, an inner main plate 112, an inner latch plate 114, an outer latch plate 116, an extension arm 118, a strap hinge pin 120, and a strap anchor point 140. A reefing cutter may be provided to sever a line securing extension arm 118. Moreover, parachute release mechanism 102 may comprise any suitable components configured to releasably connect suspension straps 104 to a payload. Parachute release mechanism 102 is configured with a structure at least partially defined by outer main plate 110.

Figure 4:
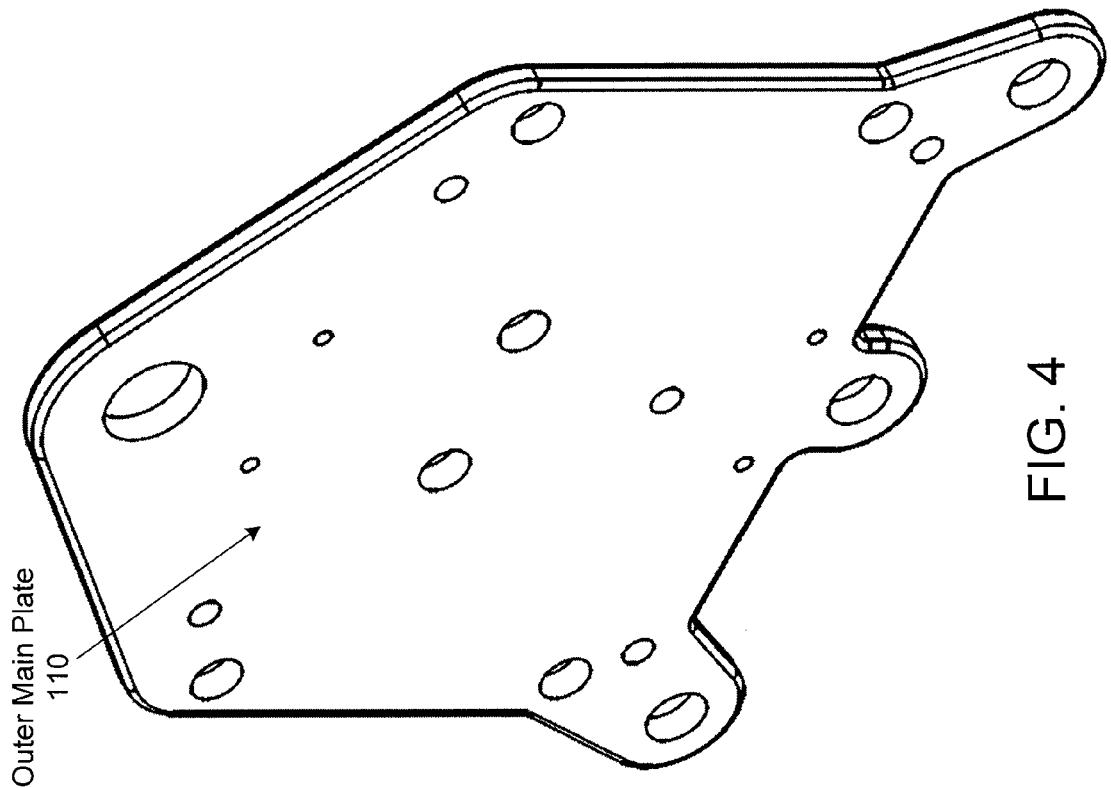
FIG. 4 illustrates an outer main plate of a parachute release mechanism in accordance with an exemplary embodiment.

Outer main plate 110 may comprise any structure configured to provide structural support to parachute release mechanism 102. Outer main plate 110 may also at least partially define an outside and/or inside surface of parachute release mechanism 102. With reference now to FIGS. 2 and 4, in an exemplary embodiment outer main plate 110 comprises a generally planar structure having multiple holes therethrough, at least one of the holes configured to receive fasteners, for example high-strength bolts. Outer main plate 110 may comprise metal (e.g., aluminum, steel, titanium, magnesium, and the like, and/or alloys and combinations of the same), plastic, composite, or any other suitable material configured to provide structural support to parachute release mechanism 102.

Outer main plate 110 may be coupled to inner main plate 112, for example by use of fasteners. In an exemplary embodiment, outer main plate 110 is coupled to inner main plate 112 by use of bolts, nuts, washers, and/or spacers. Outer main plate 110 is also coupled to inner latch plate 114, outer latch plate 116, extension arm 118, and strap hinge pin 120. Moreover, outer main plate 110 may be coupled to inner main plate 112 and/or to other components of parachute release mechanism 102 in any suitable manner configured to allow operation of parachute release mechanism 102.

In an exemplary embodiment, parachute release mechanism 102 comprises a pair of outer main plates 110 configured in a generally parallel arrangement. However, parachute release mechanism 102 may comprise any suitable number of outer main plates 110. Moreover, one or more outer main plates 110 may be configured, located, and/or aligned in any appropriate configuration relative to each other and to other components of parachute release mechanism 102. Outer main plate 110 is coupled to inner main plate 112 such that outer main plate 110 and inner main plate 112 generally define parallel, non-intersecting planes.

Figure 3:
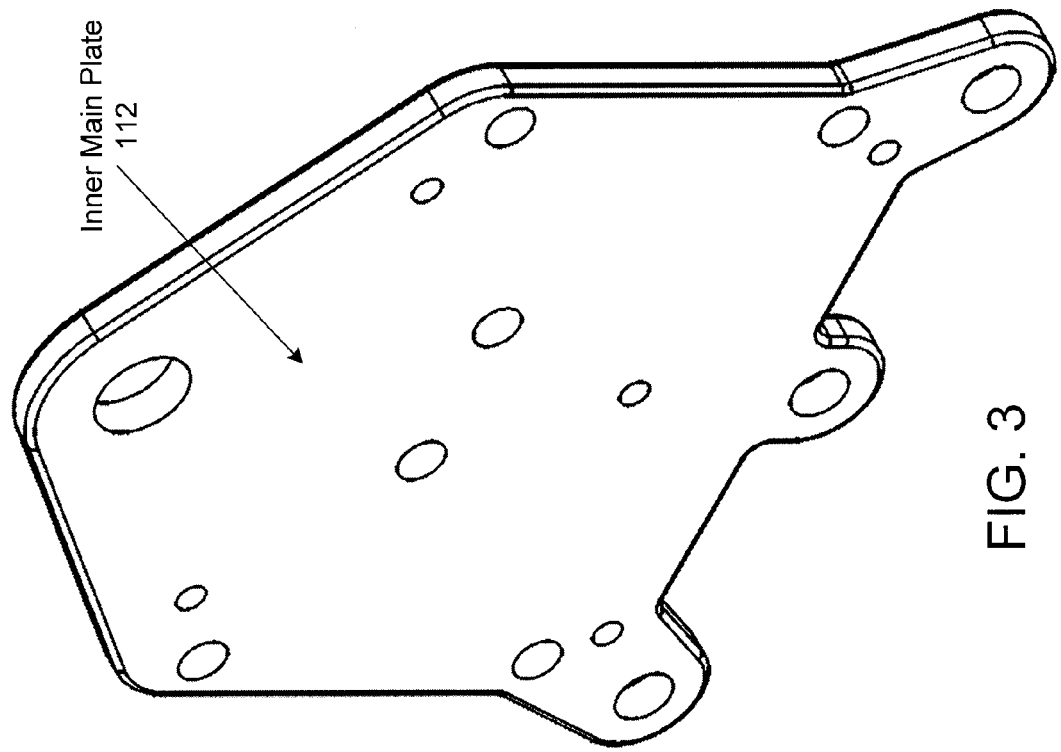
FIG. 3 illustrates an inner main plate of a parachute release mechanism in accordance with an exemplary embodiment.

Inner main plate 112 may comprise any structure configured to provide interior and/or structural support to parachute release mechanism 102. With reference now to FIGS. 2 and 3, and in an exemplary embodiment, inner main plate 112 comprises a generally planar structure having various holes therethrough, at least a portion of the holes being configured to receive fasteners, for example high-strength bolts. Moreover, inner main plate 112 may at least partially and/or fully define two or more interior regions within parachute release mechanism 102 in order to allow release of one or more suspension straps 104.

Inner main plate 112 may comprise metal (e.g., aluminum, steel, titanium, magnesium, and the like, and/or alloys and combinations of the same), plastic, composite, or any other suitable material configured to provide structural support to parachute release mechanism 102.

Inner main plate 112 may be coupled to one or more outer plates 110, for example by use of fasteners. In an exemplary embodiment, inner main plate 112 is coupled to outer main plate 110 by use of bolts, nuts, washers, and/or spacers. Inner main plate 112 is also coupled to inner latch plate 114, outer latch plate 116, extension arm 118, and strap hinge pin 120. Inner main plate 112 may also be coupled to one or more additional inner main plates 112, for example in order to at least partially define an additional interior region within parachute release mechanism 102 in order to allow release of additional suspension straps 104. For example, parachute release mechanism 102 may comprise two inner main plates 112 in order to generally define three interior regions within parachute release system 102, and thus facilitate release of six suspension straps 104 (two straps per region, as explained hereinbelow). Moreover, inner main plate 112 may be coupled to outer main plate 110 and/or to other components of parachute release mechanism 102 in any suitable manner configured to allow operation of parachute release mechanism 102. Inner main plate 112 is coupled to inner latch plate 114.

Figure 5B:
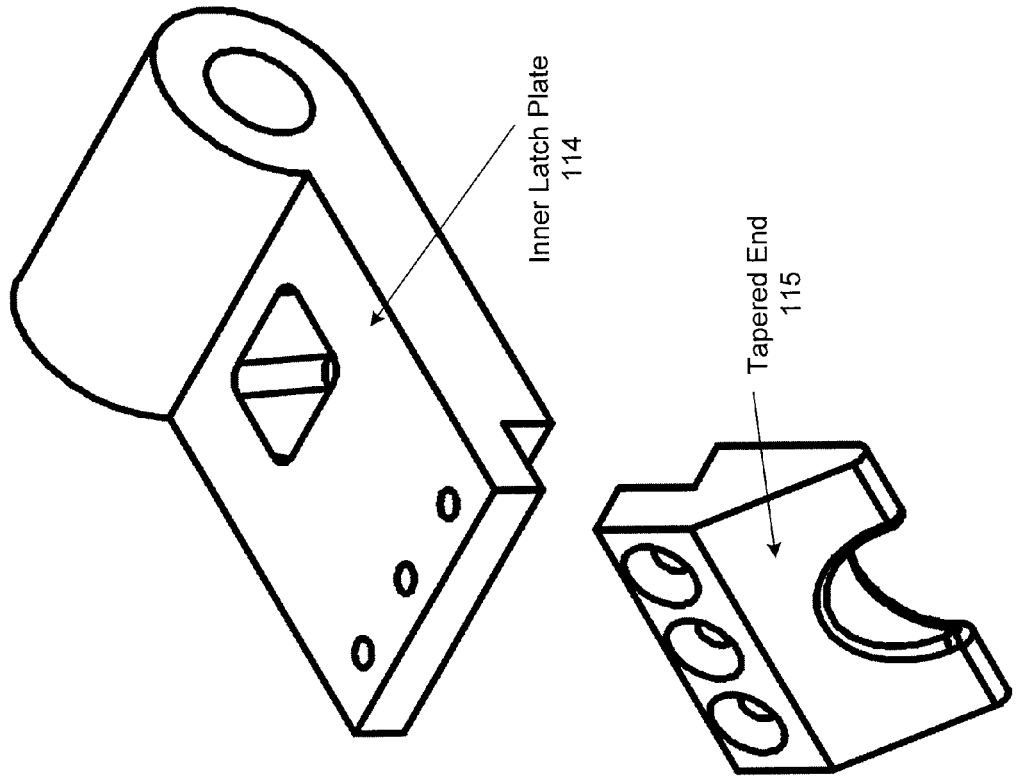
FIG. 5B illustrates an inner latch plate of a parachute release mechanism in accordance with an exemplary embodiment.

Inner latch plate 114 may comprise any component and/or structure configured to releasably couple with strap hinge pin 120. With reference now to FIGS. 2 and 5B, in an exemplary embodiment inner latch plate 114 comprises a structure having a generally rectangular and planar main body. One end of the main body of inner latch plate 114 may be thicker than the remainder of the main body. Passing through this thicker end is a cylindrical hole configured to receive a bolt. The cylindrical hole may be located in the plane of the main body and run parallel to the shorter side of inner latch plate 114. In this manner, inner latch plate 114 may be configured to rotate about an axis of a bolt received within the cylindrical hole.

Inner latch plate 114 further comprises a cavity configured to releasably receive a portion of strap hinge pin 120, for example hinge pin tip 121. Inner latch plate 114 also comprises tapered end 115. Inner latch plate 114 may comprise metal (e.g., aluminum, steel, titanium, magnesium, and the like, and/or alloys and combinations of the same), plastic, composite, or any other suitable material.

In various exemplary embodiments, the cavity of inner latch plate 114 may be hemispherical, cubic, keyhole-shaped, and/or any suitable shape or size configured to receive a portion of strap hinge pin 120. Additionally, the cavity of inner latch plate 114 may be configured to separate from strap hinge pin 120 upon partial rotation or other desired movement of inner latch plate 114. The edges of the cavity may be tapered, beveled, chamfered, and/or the like. Moreover, the cavity may be configured in any suitable manner configured to allow insertion and removal of a portion of strap hinge pin 120.

Tapered end 115 of inner latch plate 114 is located at the end of inner latch plate 114 opposite the cylindrical hole. In various exemplary embodiments, tapered end 115 is configured with a taper at an angle between about 5 and about 40 degrees relative to the plane of the main body of inner latch plate 114. In an exemplary embodiment, tapered end 115 is configured with a taper at an angle of 15 degrees relative to the plane of the main body of inner latch plate 114. Tapered end 115 may be configured to extend into a space between the main body of outer latch plate 116 and hooked end 117 of outer latch plate 116. In this manner, hooked end 117 may engage tapered end 115 when outer latch plate 116 is moved, providing force configured to move inner latch plate 114 a sufficient distance to uncouple strap hinge pin 120. Moreover, inner latch plate 114 may be configured to move responsive to movement of outer latch plate 116 in any suitable manner.

In various exemplary embodiments, one or more components of parachute release mechanism 102, for example inner latch plate 114 and/or tapered end 115, may comprise sacrificial, shock-absorbing, and/or otherwise reusable, repairable, and/or replaceable portions. For example, the main body of inner latch plate 114 may comprise a high-strength alloy, for example an alloy of iron and nickel (e.g., steel), an alloy of titanium, and/or the like. Tapered end 115 may comprise a different, lower-strength alloy, for example an alloy of aluminum. Tapered end 115 may be releasably coupled to inner latch plate 114, for example via fasteners. In this manner, tapered end 115 may be removed and replaced as desired, for example responsive to mechanical wear, deformation, fatigue, and/or other conditions of tapered end 115.

Additionally, due to the significant forces associated with releasing a parachute from a payload, one or more components of parachute release mechanism 102 may be configured to reduce deformation, swelling, nicks, scratches, and/or other damage resulting from components of parachute release mechanism 102 coming into contact with one another before, during, and/or after operation of parachute release mechanism 102. For example, in various exemplary embodiments, tapered end 115 may contact hinge pin 120 after operation of parachute release mechanism 102, resulting in deformation of tapered end 115 and/or nicks in the surface of hinge pin 120. To reduce the resultant damage, tapered end 115 may be configured with a semicircular "saddle" as illustrated in FIGS. 2 and 5B. The semicircular saddle has a curvature similar to a curvature of hinge pin 120. In this manner, when tapered end 115 moves toward hinge pin 120, hinge pin 120 descends into the semicircular saddle and thus contacts a semicircular area, rather than striking a single point or linear area on tapered end 115. Thus, the impact force between tapered end 115 and hinge pin 120 is spread across a larger surface area than if tapered end 115 was configured with a linear end. Damage to tapered end 115 and/or hinge pin 120 is thus desirably reduced. Moreover, hinge pin 120 and/or tapered end 115 may be configured with any suitable shapes, dimensions, angles, curves, geometries, and/or the like, in order to reduce damage to tapered end 115 and/or hinge pin 120 resulting from contact therebetween.

Moreover, tapered end 115 may also contact other portions of parachute release mechanism 102, for example outer latch plate 116. In various exemplary embodiments, tapered end 115 comprises a material softer than the material comprising outer latch plate 116 in order to reduce damage to outer latch plate 116.

Figure 5A:
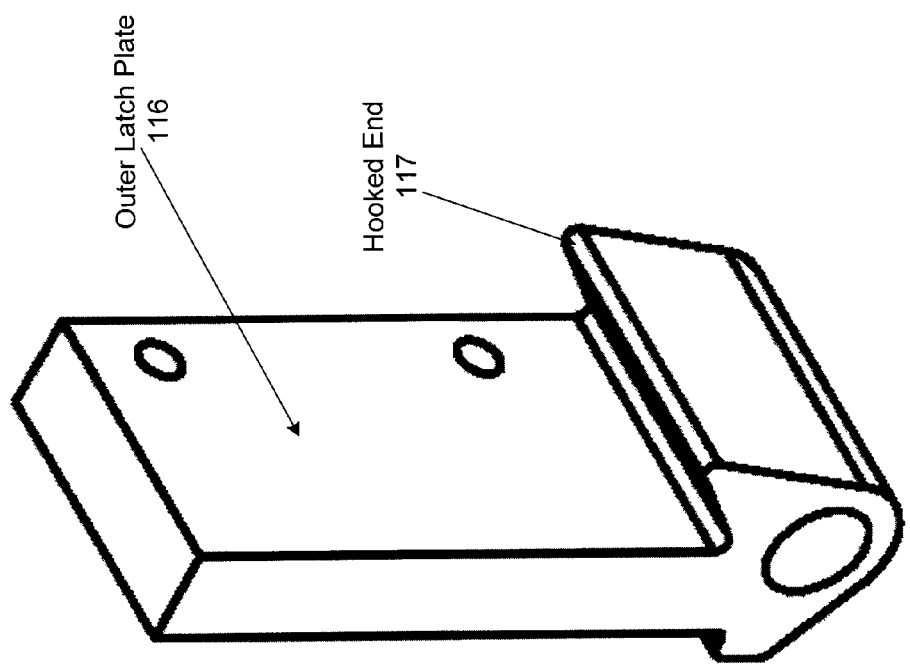
FIG. 5A illustrates an outer latch plate of a parachute release mechanism in accordance with an exemplary embodiment.

Outer latch plate 116 may comprise any component and/or structure configured to engage inner latch plate 114. With reference now to FIGS. 2 and 5A, in an exemplary embodiment outer latch plate 116 comprises a generally planar structure having hooked end 117 extending therefrom. Outer latch plate 116 further comprises a cylindrical hole therethrough located at the same end of outer latch plate 116 as hooked end 117. The cylindrical hole may be located in the plane of the main body and may run parallel to a shorter side of outer latch plate 116. In this manner, outer latch plate 116 may rotate about an axis of a bolt received within the cylindrical hole.

Outer latch plate 116 may comprise metal (e.g., aluminum, steel, titanium, magnesium, and the like, and/or alloys and combinations of the same), plastic, composite, or any other suitable material.

Outer latch plate 116 may be coupled to outer main plate 110, inner main plate 112, and extension arm 118. Moreover, outer latch plate 116 may be coupled to other components of parachute release system 102, as desired, via any suitable means configured to allow operation of outer latch plate 116.

In various exemplary embodiments, hooked end 117 of outer latch plate 116 is configured to allow a portion of tapered end 115 of inner latch plate 114 to extend between hooked end 117 and the main body of outer latch plate 116, as illustrated in FIG. 2. Hooked end 117 may be configured as a rounded extrusion of outer latch plate 116 extending at an acute angle from the main body of outer latch plate 116. In various exemplary embodiments, hooked end 117 extends outward from the main body of outer latch plate 116 at an angle of between about 30 degrees and about 70 degrees relative to the plane of the main body of outer latch plate 116. In an exemplary embodiment, hooked end 117 extends outward from the main body of outer latch plate 116 at an angle of about 45 degrees relative to the plane of the main body of outer latch plate 116.

In various exemplary embodiments, with reference to FIG. 2, hooked end 117 is configured to extend at an acute angle greater than the angle of tapered end 115. In this manner, hooked end 117 may not engage tapered end 115 until outer latch plate 116 has partially rotated and thus acquired a portion of kinetic energy. Hooked end 117 may then apply a hammer-like blow as it engages tapered end 115, causing inner latch plate 114 to rotate outward and separate from strap hinge pin 120. Moreover, hooked end 117 may be configured with any suitable angle, flange, structure, extrusion, extension, and/or other component configured to allow hooked end 117 to engage tapered end 115.

Because hooked end 117 engages tapered end 115 as outer latch plate 116 rotates, time delays between releases of suspension straps 104 from strap hinge pins 120 in parachute release mechanism 102 may be reduced and/or minimized. For example, in this manner, time differentials between release of a particular suspension strap 104 and another suspension strap 104, such as time differentials resulting from friction differentials, load differentials, alignment differentials, and/or the like, may be reduced and/or minimized, as various strap hinge pins 120 are simultaneously and/or nearly simultaneously separated from corresponding inner latch plates 114. This simultaneous and/or nearly simultaneous separation may be facilitated via use of extension arm 118.

Figure 5D:
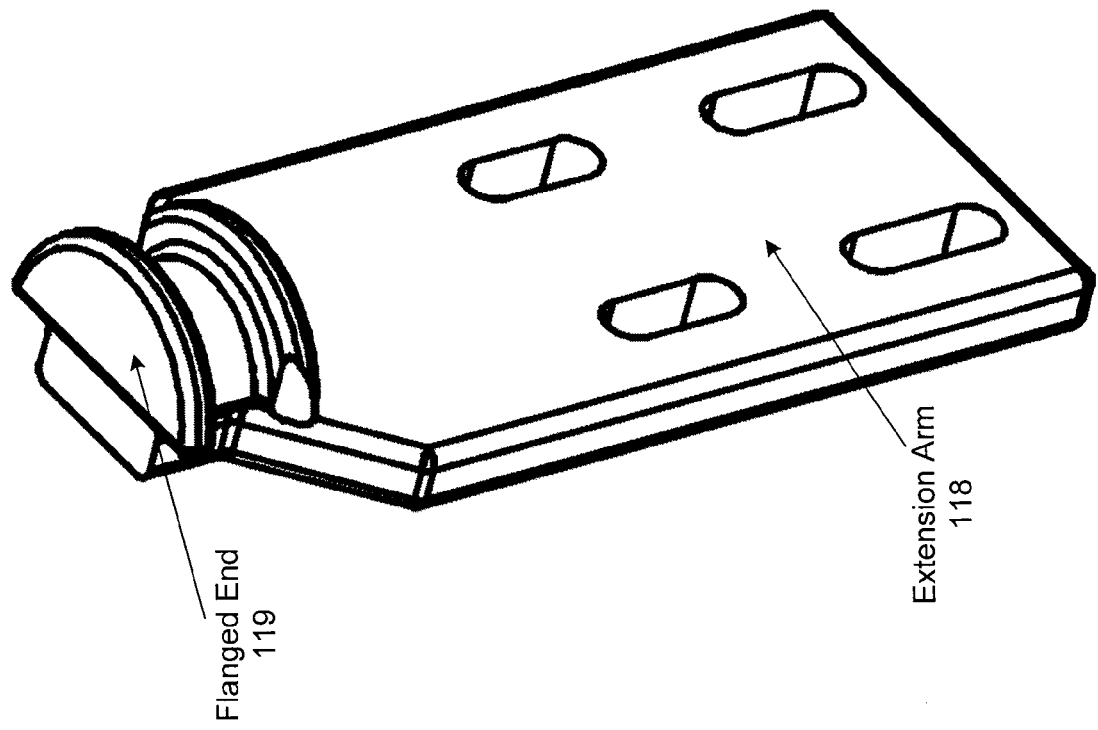
FIG. 5D illustrates an extension arm of a parachute release mechanism in accordance with an exemplary embodiment.
Figure 5C:
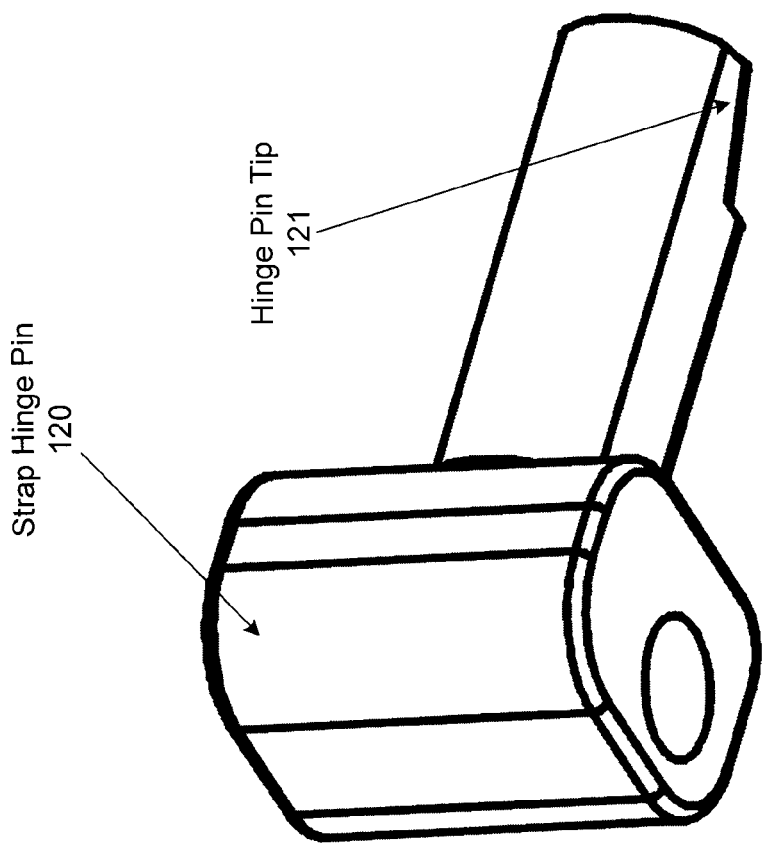
FIG. 5C illustrates a strap hinge pin of a parachute release mechanism in accordance with an exemplary embodiment.

Extension arm 118 may comprise any components and/or structure configured to couple to outer latch plate 116. With reference now to FIGS. 2 and 5D, in an exemplary embodiment extension arm 118 comprises a generally planar structure having flanged end 119. Extension arm 118 may be configured with a number of holes, for example four holes configured to receive mounting hardware in order to couple extension arm 18 to one or more outer latch plates 116.

Extension arm 118 may comprise metal (e.g., aluminum, steel, titanium, magnesium, and the like, and/or alloys and combinations of the same), plastic, composite, or any other suitable material. Extension arm 118 may be coupled to one or more outer latch plates 116 via any suitable means, for example via fasteners, adhesives, welding, and/or the like. In various exemplary embodiments, one extension arm 118 is coupled to two outer latch plates 116. In other exemplary embodiments, one extension arm 118 is coupled to three outer latch plates 116. Moreover, an extension arm 118 may be coupled to any suitable number of outer latch plates 116, as desired. Additionally, an extension arm 118 may be configured with a single flanged end 119 and/or multiple flanged ends 119, as desired.

In various exemplary embodiments, flanged end 119 is configured to be releasably secured, for example via a retaining strap, in order to releasably secure extension arm 118 in a first position. In an exemplary embodiment, two flanged ends 119 are located generally opposite one another on corresponding sides of parachute release system 102, as illustrated in FIG. 2. A retaining strap, for example a cut loop, is placed around the two flanged ends 119 and secured. In this manner, the flanged ends 119 are secured in a first position. When the retaining strap is severed, released, or otherwise removed (for example, through operation of a reefing cutter or other suitable means), the two flanged ends 119 are released, allowing any extension arms 118 coupled to the two flanged ends 119 to move at least partially toward a second position.

Figure 8:
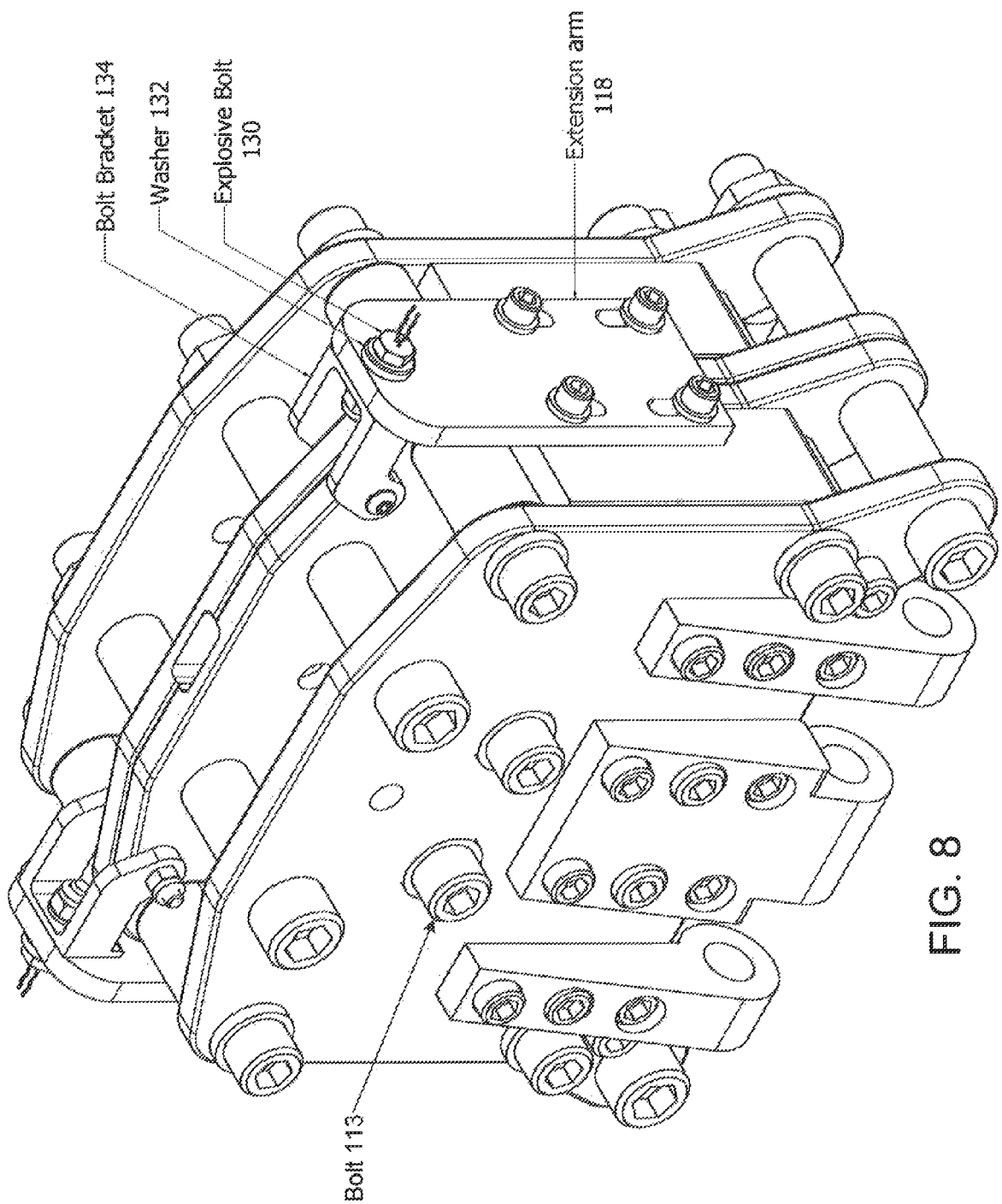
FIG. 8 illustrates an explosive bolt securing an extension arm in accordance with an exemplary embodiment.

In various other exemplary embodiments, extension arm 118 comprises a generally planar structure configured without a flanged end. With reference now to FIG. 8, in an exemplary embodiment extension arm 118 is configured to be releasably secured in a first position via an explosive bolt. An attachment mechanism, for example bolt bracket 134, is attached to inner main plate 112. Bolt bracket 134 is coupled to extension arm 118 via explosive bolt 130 and washer 132. Explosive bolt 130 may comprise any suitable size, shape, explosive material, detonation means, and/or any other suitable components or configuration suitable to allow extension arm 118 to be releasably secured in a first position.

In an exemplary embodiment, explosive bolt 130 comprises a hollowed out metal bolt with an explosive charge packed in the cavity. The explosive charge cavity further comprises an internal machined groove, such as a V-groove, configured to cause the bolt to fracture at a specific plane. Shims or other guidance mechanisms may also be utilized to cause the bolt fracture plane to coincide with the separation plane of bolt bracket 134 and extension arm 118. Moreover, a chamfer may also be machined into the faces of extension arm 118 and bolt bracket 134. In this manner, the fractured ends of explosive bolt 130 may spread and/or otherwise lock or couple themselves to extension arm 118 and/or bolt bracket 134 responsive to operation of explosive bolt 130, thus reducing the possibility of portions of explosive bolt 130 becoming undesirable projectiles. Additionally, this configuration can cause the explosive energy from explosive bolt 130 to at least partially force separation of extension arm 118 and bolt bracket 134. When explosive bolt 130 is detonated, extension arm 118 is released from bolt bracket 134, allowing extension arm 118 and any attached outer latch plates 116 to move at least partially toward a second position.

While specific techniques for releasably securing extension arm 118 in a first position have been presented, extension arm 118, flanged end 119, and/or other components of release mechanism 102 may be secured in a first position in any appropriate manner configured to allow extension arm 118 to be released from a first position and move at least partially toward a second position. Because extension arm 118 is coupled to outer latch plate 116, and because hooked end 117 of outer latch plate 116 is configured to engage tapered end 115 of inner latch plate 114, movement of extension arm 118 effectuates movement of inner latch plate 114, allowing strap hinge pin 120 to decouple from inner latch plate 114 and thus release suspension strap 104. with little or no frictional damage and/or wear. Additionally, strap hinge pin 120 may be configured to be harder than other components of parachute release mechanism 102 in order to reduce and/or prevent nicks, dings, scrapes, divots, and/or other deformation and/or damage to strap hinge pin 120 resulting from contact with other components of parachute release mechanism 102.

Strap hinge pin 120 may be coupled to outer main plate 110, inner main plate 112, and inner latch plate 114. For example, strap hinge pin 120 may be coupled to outer main plate 110 and inner main plate 112 via a bolt 113 passing through the cylindrical hole in the first body of strap hinge pin 120. In this manner, strap hinge pin 120 may rotate about an axis of bolt 113. Additionally, strap hinge pin 120 may be releasably coupled to inner latch plate 114, for example via insertion of hinge pin tip 121 into a cavity in inner latch plate 114, Moreover, strap hinge pin 120 may be coupled to other components of parachute release system 102 via any suitable means configured to allow operation of strap hinge pin 120.

In various exemplary embodiments, hinge pin tip 121 is configured to extend at least partially into a cavity of inner latch plate 114. Hinge pin tip 121 may be chamfered, tapered, beveled, and/or otherwise shaped and/or configured in any suitable manner to be received within a cavity of inner latch plate 114. In this manner, strap hinge pin 120 may be prevented from rotating due to engagement with at least a portion of a cavity of inner latch plate 114. Additionally, strap hinge pin 120 may thus be supported on one side by bolt 113 coupled to outer main plate 110 and inner main plate 112, and supported on the other side by inner latch plate 114. Thus, strap hinge pin 120 may releasably support a load, for example a cargo payload suspended beneath a parachute and coupled to strap hinge pin 120 via suspension strap 104.

In various exemplary embodiments, strap hinge pin 120 is coupled between outer main plate 110 and inner main plate 112 via bolt 113. In these exemplary embodiments, bolt 113 passes through only one strap hinge pin 120 before passing through either an outer main plate 110 or an inner main plate 112. This configuration will be referred to as a "single-bolt, single-pin" system. In other exemplary embodiments, bolt 113 passes through multiple strap hinge pins 120 before passing through either an outer main plate 110 or an inner main plate 112. This configuration will be referred to as a "single-bolt, multiple-pin" system.

By utilizing a single-bolt, single-pin system, the strength of parachute release mechanism 102 may be increased for a given mass of parachute release mechanism 102 when compared to a single-bolt, multiple-pin system, because bolt 113 only passes through only one strap hinge pin 120, and hence has only one applied load, before bolt 113 passes again through either an outer main plate 110 or an inner main plate 112 and is thus again supported. Thus, bolt 113 may be made smaller and/or of less expensive materials, as desired. Correspondingly, by utilizing a single-bolt, single-pin system, parachute release system 100 may support a larger payload without a significant increase in mass.

Because parachute release mechanism 102 may be constructed as a single-bolt, single-pin system, parachute release mechanism 102 may be significantly lighter than if constructed as a single-bolt, multiple-pin system in order to support a particular payload weight. For example, a single-bolt, multiple-pin system may require increased bolt diameter, increased bearing diameter, increased inner and/or outer plate wall thickness, and the like, in order to support a similar payload weight, leading to significantly greater mass for the single-bolt, multiple-pin system.

Parachute release mechanism 102 may be configured with any suitable number of strap hinge pins 120, as desired. In an exemplary embodiment, parachute release mechanism 102 comprises four strap hinge pins 120. In various other exemplary embodiments, parachute release mechanism 102 comprises two, six, eight, ten, or more strap hinge pins 120, together with a suitable corresponding number of inner main plates 112, inner latch plates 114, outer latch plates 116, extension arms 118, strap anchor points 140, and/or the like. In this manner, parachute release mechanism 102 may be configured to support a desired number of suspension straps 104 and/or payloads of various sizes, weights, and configurations.

In various exemplary embodiments, parachute release mechanism 102 is configured with a weight of between about 10 pounds and about 134 pounds. In an exemplary embodiment, parachute release mechanism 102 is configured with a weight of about 67 pounds. In various exemplary embodiments, parachute release mechanism 102 is configured to be compatible with a type V aerial delivery platform rated at up to 42,000 pounds payload capacity. Parachute release mechanism 102 may also be configured to be compatible with various other aerial delivery platforms and/or systems having higher and/or lower rated payload capacities, as desired. Moreover, in various exemplary embodiments parachute release mechanism 102 is configured to support a payload weight of between about 500 pounds and about 42,000 pounds, while providing a safety margin greater than 100%. Stated another way, in these exemplary embodiments parachute release mechanism 102 is suitable for use with a payload weight of up to about 42,000 pounds, and is sufficiently strong to avoid catastrophic failure unless used with a payload in excess of 84,000 pounds. In other exemplary embodiments, parachute release mechanism 102 is configured with bolts having shear strength sufficient to enable parachute release mechanism 102 to be used with payloads in excess of 100,000 pounds without catastrophic failure. Parachute release mechanism 102 may thus be configured as appropriate for a particular payload weight, and then desirably coupled to various parachutes, risers, and/or suspension straps 104 configured to support a particular payload weight.

Figure 6:
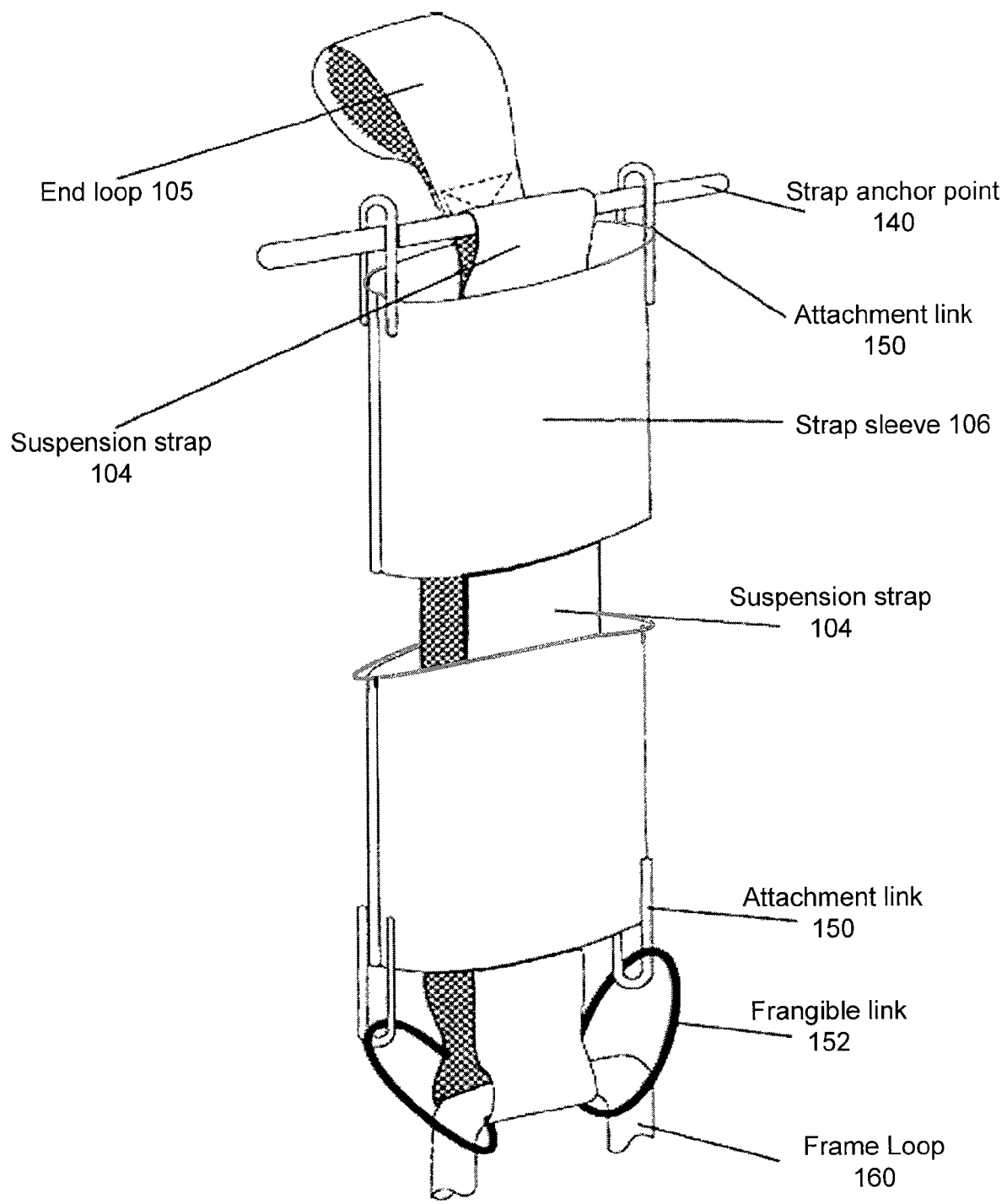
FIG. 6 illustrates a suspension strap passing through a suspension strap sleeve in accordance with an exemplary embodiment.

Suspension strap 104 may comprise any components configured to couple parachute release mechanism 102 to a load, for example a payload suspended below a parachute. With reference now to FIGS. 1B and 6, in an exemplary embodiment suspension strap 104 comprises planar fabric material. Suspension strap 104 may comprise nylon, polyethylene terephthalate (e.g., Dacron®), ultra-high molecular weight polyethelyne (e.g., Spectra®), poly paraphenylene terephthalamide (e.g., Kevlar®), and/or other high-modulus aramid fibers, or any other suitably strong, flexible, and/or lightweight material.

Suspension strap 104 is releasably coupled to strap hinge pin 120. For example, suspension strap 104 may be configured with an end loop 105. End loop 105 may be slipped over a strap hinge pin 120. Strap hinge pin 120 may then be rotated and coupled to inner latch plate 114, for example by causing hinge pin tip 121 to be placed at least partially within a cavity of inner latch plate 114. In this manner, suspension strap 104 is releasably secured to strap hinge pin 120, and thus releasably secured to parachute release mechanism 102. When strap hinge pin 120 is allowed to rotate due to movement of inner latch plate 114 and responsive to force applied by suspension strap 104 (for example, weight of the payload transmitted through suspension strap 104), end loop 105 can slide off strap hinge pin 120, separating this point of connection between suspension strap 104 and parachute release mechanism 102.

In an exemplary embodiment, one suspension strap 104 is coupled to one strap hinge pin 120. In various other exemplary embodiments, two suspension straps 104 are coupled to one hinge pin 120. Moreover, any number of suspension straps 104 may be coupled to a particular hinge pin 120. Additionally, a suspension strap 104 may be coupled to multiple hinge pins 120, as desired.

In various exemplary embodiments, with additional reference to FIG. 2, one or more suspension straps 104 may be coupled to a strap anchor point 140. In this manner, suspension strap 104 may be retained with release mechanism 102 after separation of a payload, because suspension strap 104 remains coupled to strap anchor point 140 after suspension strap 104 has decoupled from strap hinge pin 120. Suspension strap 104 may also be coupled to, contained within, protected by, and/or otherwise guided, controlled, or managed via use of strap sleeve 106.

Strap sleeve 106 may comprise any components configured to couple to, contain, protect control, and/or otherwise guide suspension strap 104 before, during, and/or after operation of parachute release mechanism 102. With reference now to FIGS. 1B and 6, in an exemplary embodiment strap sleeve 106 comprises fabric material configured to at least partially surround or otherwise enclose or contain suspension strap 104. Strap sleeve 106 may comprise canvas, nylon, rayon, and/or the like, or any other suitable flexible and/or low-friction material. Moreover, strap sleeve 106 may be configured as a tube-like structure having a single chamber (e.g., one tube), a double chamber (e.g., two generally parallel tubes), and/or any other suitable number of chambers configured to receive suspension strap 104. However, a single-chamber strap sleeve 106 can allow reduced manufacturing costs as well as reduced installation complexity.

In an exemplary embodiment, strap sleeve 106 is configured to be similar in length to a corresponding suspension strap 104. For example, strap sleeve 106 may be configured to have an initial, uncompressed length from between about 10 percent shorter to about 10 percent longer than a corresponding suspension strap 104. Strap sleeve 106 may also be configured to have an initial, uncompressed length from between about 5 percent shorter to about 5 percent longer than a corresponding suspension strap 104. Moreover, strap sleeve 106 may be reversibly compressed, collapsed, folded (such as through pleating or other repetitive folding), deformed, and/or be otherwise configured to assume a length of about one-half of the length of a corresponding suspension strap 104. Strap sleeve 106 may be permitted to unfold, decompress, and/or otherwise expand or return at least partially to an initial, uncompressed length responsive to separation of suspension strap 104 from strap hinge pin 120. In this manner, strap sleeve 106 may at least partially contain suspension strap 104 both when suspension strap 104 is fully extended (after separation from strap hinge pin 120) as well as when suspension strap 104 is folded double within strap sleeve 106 (while suspension strap 104 is supporting a payload beneath parachute release mechanism 102).

With continued reference to FIG. 6, strap sleeve 106 may be coupled to one or more attachment links 150, for example at both ends of strap sleeve 106. An attachment link 150 located at a first end of strap sleeve 106 may be coupled to parachute release mechanism 102, for example at strap anchor point 140, in order to couple strap sleeve 106 to parachute release mechanism 102. Strap sleeve 106 may thus be retained with parachute release mechanism 102 after operation of parachute release mechanism 102. Another attachment link 150 located at the opposite end of strap sleeve 106 may be coupled to a payload via a frangible link 152.

Strap sleeve 106 may be configured to at least partially surround and/or contain suspension strap 104 before, during, and after separation of suspension strap 104 from hinge pin 120. For example, suspension strap 104 may be coupled at a first end to a fixed location on parachute release mechanism 102, for example strap anchor point 140 as illustrated in FIG. 2. Suspension strap 104 may then be routed through strap sleeve 106, through an anchor point on a payload carrier (for example an eye bolt, a frame loop 160 as shown in FIG. 6, and/or the like, or any other suitable attachment point), and then back through strap sleeve 106. A second end of suspension strap 104, for example end loop 105, may then be coupled to strap hinge pin 120.

In this manner, when a payload is separated from a parachute due to operation of parachute release system 100, each suspension strap 104 remains substantially within a corresponding strap sleeve 106 as the released end of suspension strap 104 moves through the strap sleeve 106 toward the anchor point on the payload, and as strap sleeve 106 expands correspondingly. Once suspension strap 104 has passed through the corresponding anchor point, strap sleeve 106 may be fully expanded and thus substantially contain separated suspension strap 104. In this manner, suspension strap 104 may be guided as it separates from a payload, reducing the potential for interference or entanglement with other suspension straps 104, support lines, parachutes, payload material, aerial delivery systems, and/or the like.

In accordance with various exemplary embodiments, parachute release system 100 is coupled to a parachute and to a payload. Once the parachute is deployed, parachute release mechanism 102 may be operated, for example, after a predetermined period of time, after the payload has reached a certain altitude, after the payload has reached a certain airspeed, and/or at any other suitable time desired for operation of parachute release mechanism 102. Additionally, parachute release mechanism 102 may be configured for remote operation. For example, parachute release mechanism 102 may be configured with wireless communication components allowing a user to send an operative command, for example an activation command, to parachute release mechanism 102 and/or other components of parachute release system 100. For example, a reefing cutter, an explosive bolt, or other component of parachute release mechanism 102 may be triggered responsive to a command received at parachute release mechanism 102. In this manner, a user may monitor the descent of a payload, the inflation of a drogue parachute, the inflation of an intermediary parachute, and/or the like, and may trigger operation of parachute release mechanism 102 once a desired activation criterion has been achieved. Parachute release mechanism 102 may also be configured to activate after a predetermined time period (for example, 10 seconds) if an operative command has not been received. Parachute release mechanism 102 may further be configured to be activated responsive to any suitable condition, for example altitude of a payload, velocity of a payload, atmospheric pressure, temperature, and/or the like, as desired.

For example, due to the dynamic and somewhat chaotic conditions associated with opening of a parachute, operation of parachute mechanism 102 may suitably be accelerated, delayed, or otherwise modified and/or controlled. For example, operation of parachute release mechanism 102 may be delayed in order to allow a drogue parachute additional time to inflate, or in order to allow a payload to descend at a higher rate for an extended period of time, as desired. Additionally, operation of parachute release mechanism 102 may be accelerated, in order to allow a payload to descend into a revised location and/or at a lower rate of speed, or in order to expedite separation of a damaged and/or failed parachute from a payload.

Figure 9A:
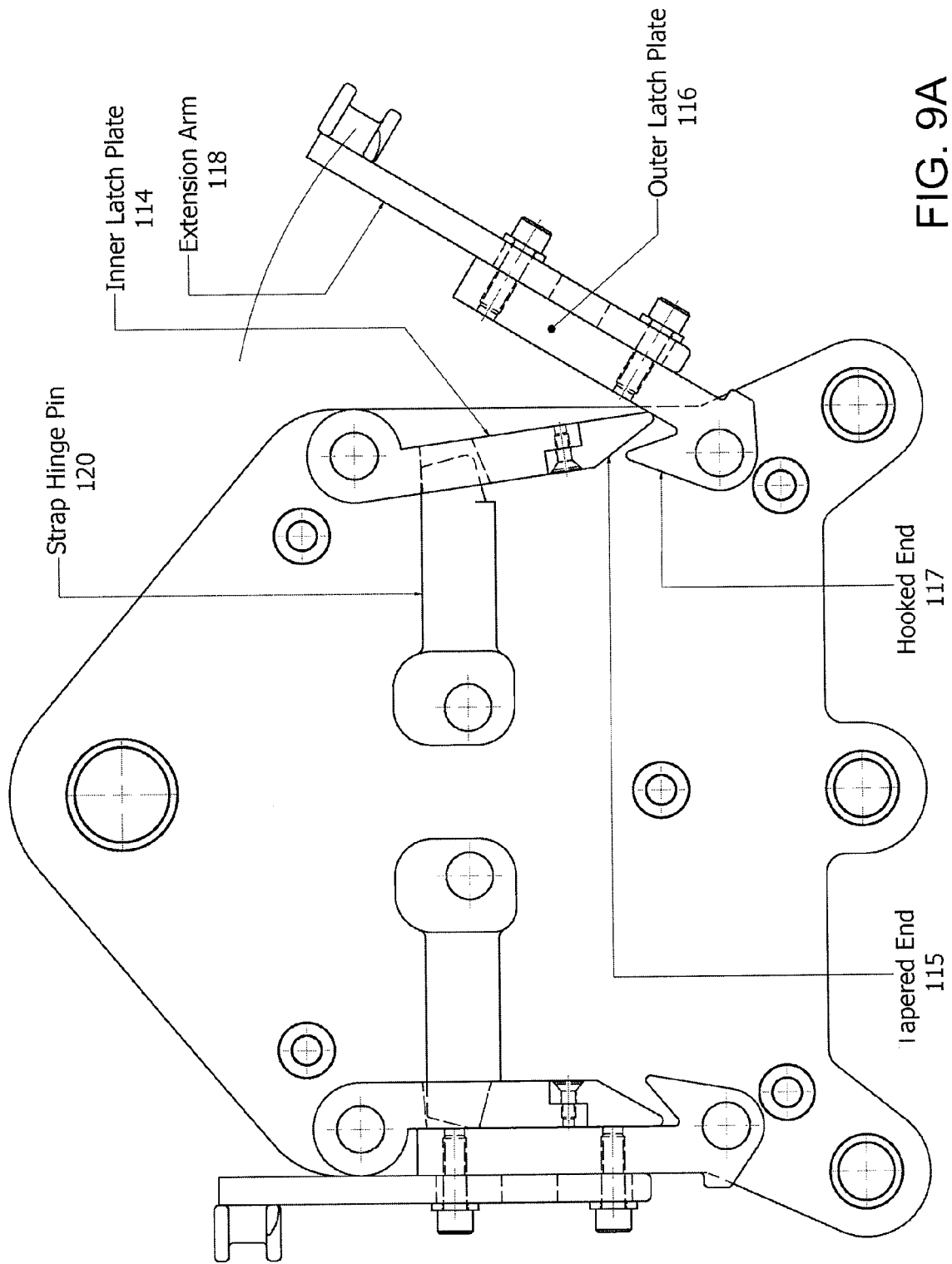
FIGS. 9A and 9B illustrate operation of a parachute release mechanism in accordance with an exemplary embodiment.
Figure 9B:
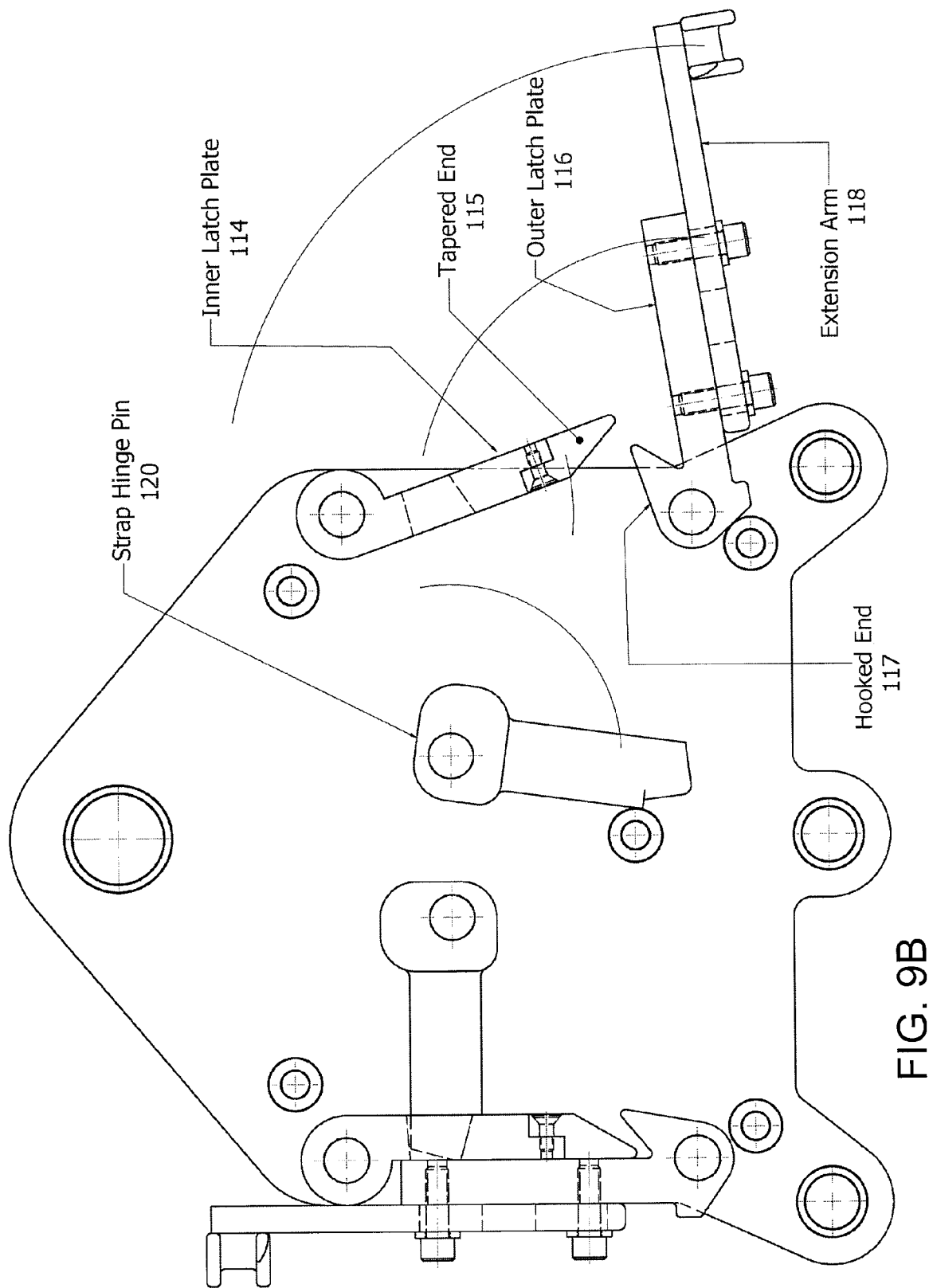

In various exemplary embodiments, parachute release mechanism 102 may be operated in order to release a parachute from a payload. Extension arms 118 are released from their secured condition, for example by operation of a reefing cutter, an explosive bolt, and/or any other suitable method and/or mechanism. With reference now to FIGS. 9A and 9B, due to gravity and/or the off-plane center of balance of extension arms 118 and outer latch plates 116, outer latch plates 116 rotate outward and downward. Additionally, outer latch plates 116 may be forced outward and downward, for example by energy applied via operation of an explosive bolt. Hooked ends 117 thereby engage tapered ends 115 and provide an outward force to inner latch plates 114. Inner latch plates 114 at least partially rotate, and are thus separated from strap hinge pins 120, allowing strap hinge pins 120 to rotate downward and separate from suspension straps 104.

At this point, the weight of the payload causes suspension straps 104 to be drawn through strap sleeves 106, and the parachute and payload begin to move apart. Suspension straps 104 are drawn through strap sleeves 106 until the released ends of suspension straps 104 pass through the corresponding anchor points on the payload. At this point, the weight of the payload will then sever frangible links 152, separating strap sleeves 106 from the payload. When all suspension straps 104 have passed through the corresponding anchor points on the payload, and when all frangible links 152 have been severed, the payload is fully separated from the parachute.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A parachute release mechanism, comprising:
   a first plate;
   a second plate; and
   a rotatable strap hinge pin disposed between the first plate and the second plate, the rotatable strap hinge pin having a bolt passing therethrough to couple the rotatable strap hinge pin to the first plate and the second plate, wherein, in the parachute release mechanism, the bolt passes through only one rotatable strap hinge pin between the first plate and the second plate.

2. The parachute release mechanism of claim 1, further comprising an outer latch plate having a hooked end.

3. The parachute release mechanism of claim 2, further comprising an inner latch plate having a tapered end.

4. The parachute release mechanism of claim 3, wherein the hooked end and the tapered end are configured to engage responsive to rotation of the outer latch plate.

5. The parachute release mechanism of claim 4, wherein the hooked end is configured to engage the tapered end after the hooked end has acquired a portion of kinetic energy resulting from rotation of the outer latch plate.

6. The parachute release mechanism of claim 2, further comprising an extension arm coupled to the outer latch plate.

7. The parachute release mechanism of claim 6, wherein the extension arm and the outer latch plate are integrally formed.

8. The parachute release mechanism of claim 6, wherein the extension arm is releasably secured in a first configuration via a retaining strap.

9. The parachute release mechanism of claim 3, wherein the tapered end is made of a different material than the inner latch plate.

10. The parachute release mechanism of claim 3, wherein the rotatable strap hinge pin is configured with a curved surface, and wherein the tapered end is configured with a semicircular saddle configured to correspond to at least a portion of the curved surface.

11. The parachute release mechanism of claim 1, wherein the parachute release mechanism is configured to support a particular payload weight, and wherein the parachute release mechanism is lighter than another parachute release mechanism configured as a single-bolt, multiple pin system and configured to support the particular payload weight.

12. The parachute release mechanism of claim 1, further comprising a suspension strap configured to couple to the rotatable strap hinge pin.

13. The parachute release mechanism of claim 1, wherein the rotatable strap hinge pin is configured to couple to multiple suspension straps.

14. A method of separating a parachute from a payload, the method comprising:

rotating a rotatable strap hinge pin disposed between a first plate and a second plate to cause a suspension strap coupled to a load to separate from the rotatable strap hinge pin, wherein the rotatable strap hinge pin has a bolt passing therethrough to couple the rotatable strap hinge pin to the first plate and the second plate, and wherein the bolt passes through only one rotatable strap hinge pin between the first plate and the second plate.

15. The method of claim 14, further comprising rotating an outer latch plate having a hooked end to cause the hooked end to engage a tapered end of an inner latch plate.

16. The method of claim 15, wherein the rotating the rotatable strap hinge pin is responsive to movement of the inner latch plate.

17. The method of claim 16, wherein the movement of the inner latch plate is responsive to the engagement of the hooked end and the tapered end.

18. The method of claim 15, further comprising activating a reefing cutter to release the outer latch plate.

19. The method of claim 15, further comprising activating an explosive bolt to release the outer latch plate.

20. The method of claim 15, wherein the rotating the rotatable strap hinge pin occurs responsive to at least one of: altitude of a payload, airspeed of a payload, elapsed time after deployment of a parachute, elapsed time after a payload exits an aircraft, failure of a parachute, or a activation command.

\* \* \* \* \*